United States Patent Office 3,723,252
Patented Mar. 27, 1973

3,723,252
METHOD FOR REMOVING PYROGENIC SUBSTANCES OUT OF UROKINASE
Nobuhisa Ogawa, Omiya, Nobuhiko Koji, Urawa, and Yukio Murayama, Saitama-Prefecture, Japan, assignors to Mochida Seiyaku Kabushiki Kaisha, Tokyo, Japan
No Drawing. Filed Aug. 23, 1971, Ser. No. 174,205
Claims priority, application Japan, Sept. 5, 1970, 45/83,546
Int. Cl. C07g 7/026
U.S. Cl. 195—66 B                 2 Claims

ABSTRACT OF THE DISCLOSURE

Method of manufacturing urokinase free from pyrogenic substances by contacting crude urokinase with weakly acidic ion exchanger at an electrolyte concentration and pH value at which said urokinase is preferentially adsorbed but pyrogenic substances are not.

SUMMARY OF THE INVENTION

The present invention relates to a method for manufacturing an urokinase suitable for injection and containing no pyrogenic substance.

As is well-known, urokinase is an enzyme adapted to be injected intravenously into the human body for the medical treatment of diseases resulting from thrombosis. It is a protein present in mammalian urine which is an activator of plasminogen.

The injection of urokinase, however, is occasionally accompanied by various side effects: chills, shaking, fever, and nausea. These side effects are attributed to a pyrogenic substance mixed with the preparation of urokinase used for injection. The identity of this pyrogenic substance is not yet certain, although it is thought to be a metabolic product of micro-organisms, which may be represented by a combination of a protein or polysaccharide with a liquid.

Urokinase, which is prepared from human urine, is likely to contain a pyrogenic substance as the result of contamination with bacteria. Thus it is vitally important to eliminate the pyrogenic substance from the preparation of urokinase to be injected.

For instance, Japanese patent publication Sho 41/16,533 discloses a method of eliminating pyrogenic substances in the manufacture of urokinase for injection purposes, by using a gel of cross-linked dextran after refining the urokinase with a weakly acidic ion-exchanger, such as Amberlite 1RC-50 (produced by Rohm & Haas of the U.S.A.).

This method, however, is complicated in operation, costly, and uncertain, because it yields urokinase which has been refined to a certain extent with a weakly acidic ion-exchanger and a constant watch is required on the relationship between the amount of dextran gel and urokinase to be treated by exploiting the filtration effect of dextran gel.

After a long search for a simplified and effective method for the removal of pyrogenic substances, the present inventors have successfully discovered that, if appropriate conditions for elution are secured, the pyrogenic substances can be effectively eliminated merely by use of a weakly acidic ion-exchanger.

Thus the present invention is characterized by making the contact with the weakly acidic ion-exchanger take place at such an electrolyte concentration and pH value that the urokinase can be readily adsorbed but the pyrogenic substance can scarcely be adsorbed at all; washing said ion-exchanger to remove the pyrogenic substance with an aqueous solution having an electrolyte concentration and pH value such that the elution of urokinase cannot take place; and thereafter separating the urokinase by elution with an eluting solvent.

In the following, a specific method of removing the pyrogenic substance in accordance with the present invention is described.

Any urokinase containing a pyrogenic substance may be used in the method of this invention. It may, for instance, be a crude urokinase solution condensed by means of an acrylonitrile synthetic fiber or kaolin, or a pure urokinase solution refined by means of an ion exchanger.

Specific methods of isolating urokinase from human male urine are described in U.S. Pats. 2,961,382; 2,989,440 and 2,983,647. According to the present invention, at first a weakly acidic ion exchanger such as Amberlite 1RC-50, a carboxylic acid type cation exchanger is buffered with an aqueous solution having an electrolyte concentration of 0.01 M-0.3 M and a pH value of 8.0-9.5. It should be noted that, if this range of the electrolyte concentration and the pH value is not employed, the buffer-treated ion exchanger will adsorb none of or the slightest of urokinase with the result being impractical for an industrial yield. Then this buffer-treated ion exchanger is added to a urokinase solution which contains pyrogenic substances to adsorb the urokinase. After this, the ion exchanger is thoroughly washed with nonpyrogenic containing distilled water or with a nonpyrogenic containing electrolyte solution having an electrolyte concentration of less than 0.3 M and a pH value, of 8.0-9.5 so that it cannot cause elution of urokinase. Thereafter, using a nonpyrogenic containing electrolyte solution with a concentration of 0.5 M-3 M and a pH value of 7.5-13, a urokinase solution containing no pyrogenic substance is obtained through elution of the urokinase from the ion exchanger with this solution.

In addition to Amberlite 1RC-50 referred to herein [as to the resin used, see such literature as U.S. Pat. 2,989,440, Biochemistry, vol. 5, No. 7, p. 2160-2169 (1966) and Biochem., Biophys. Acta, vol. 24, p. 278 (1957)], and weakly acidic ion exchange adsorbent suitable for adsorbing compounds for medical use may be used to adsorb the urokinase. Example of such weakly acidic ion exchange materials that can be used are carboxymethyl-cellulose, carboxymethyl-Sephadex (produced by Pharmacia of Sweden) and DIAION WK-10 (trade name of product by Mitsubishi Chemical Industry, Ltd. of Japan).

On the other hand, the types of electrolytes that may be used are any substance or combination of substances that dissociate into 2 or more ions in water to form an ion concentration within the critical 0.01 M to 0.3 M range. For instance, buffer solutions of dibasic potassium-disodium phosphate, ammonium chloride-ammonium or borate-sodium hydroxide can be used in the processs of this invention.

Now, the urokinase solution obtained through elution of the urokinase from the ion exchanger is then desalted to remove the electrolyte aseptically so that no pyrogenic substance may infiltrate the solution, and a preparation for injection is thus produced. For the purpose of desalting, various known methods are available such as dialysis, gel filtration, or the "Dia-flo" method.

A suitable process will now be described in greater detail.

Table 1 shows the results of the following process: 300 ml. of Amberlite 1RC-50, which has been buffered with a buffer solution of dibasic potassium and disodium phosphate with 0.02 M of said salts and a pH of 8.0, is added to a solution containing 500,000 units of urokinase. This mixture is agitated to adsorb the urokinase. The mixture is washed with 1 l. of said nonpyrogenic buffer solution, and the urokinase is gradually eluted, using each time 100 ml. of said buffer solution with its salt concentration stepped up from 0.01 M by the addition of sodium chloride. The percentage aggregating each yield of urokinase eluted by 100 ml. of said buffer solution is observed as being 95% of recovery relative to the original urokinase yield of 100 percent.

TABLE 1.—EFFECT OF ELECTROLYTE CONCENTRATION IN ELUENT

| | Total temperature rise in three rabbits (° C.) | Urokinase yield (percent) |
|---|---|---|
| Crude urokinase solution | 3.17 | 100 |
| Sodium chloride: | | |
| 0.01 M added | 3.29 | 7 |
| 0.05 M added | 2.98 | 3 |
| 0.10 M added | 2.04 | 0 |
| 0.25 M added | 0.86 | 0 |
| 0.50 M added | 0.32 | 79 |
| 0.75 M added | 0.51 | 6 |
| 1.00 M added | 0.40 | 0 |

In this test for pyrogenic substances, pursuant to the Japanese Pharmacopoeia, 7th edition, both the crude urokinase solution and each eluent were administered to the rabbits at a rate of 3 ml./kg. For the calculation of the urokinase yield, unit assay was made in accordance with the fibrin plate process [J. Ploug: Biochem., Biophys. Acta, vol. 24, p. 278 (1954)].

Table 2 summarizes the results of the following process: A column, 4 cm.$\phi$ x 24 cm., containing 300 ml. of Amberlite 1RC-50, in which urokinase had been adsorbed in the same way as in the example of Table 1, was washed with a nonpyrogenic buffer solution of dibasic potassium phosphate and disodium phosphate at 0.01 m and pH 8.0. Each 250 ml. fraction of the washing was checked for pyrogenic degree.

TABLE 2.—PYROGENIC DEGREE OF FRACTIONATED WASHING

| Washing (ml.) | Total temperature rise in three rabbits (° C.) | Eluted urokinase yield (percent) |
|---|---|---|
| 0-500 | 3.48 | 8 |
| 501-750 | 3.61 | 5 |
| 751-1,000 | 3.38 | 0 |
| 1,001-1,250 | 2.54 | 0 |
| 1,251-1,500 | 1.93 | 0 |
| 1,501-1,750 | 0.46 | 0 |
| 1,751-2,000 | 0.37 | 0 |

As evident from Tables 1 and 2, the pyrogenic substance can be eliminated from a weakly acidic ion exchanger with practically no loss of urokinase, if the pH value and electrolyte concentration are adequately selected.

The invention will be illustrated in more detail by the following examples:

EXAMPLE 1

A million units of a crude urokinase solution (specific activity: 4100 units/mg.), obtained by elution with an alkaline solution after selective adsorption of urokinase in human urine on acrylonitrile synthetic fiber, was adsorbed on a column, 3 cm.$\phi$ x 40 cm., of Amberlite 1RC-50, buffer-treated with a 0.01 M solution of disodium phosphate. It was then washed with 10 l. of the above-mentioned nonpyrogenic electrolyte solution; and thereafter, eluted with the same nonpyrogenic salt solution, to which 0.5 M of sodium chloride had been added.

The resulting eluent was subjected to overnight dialysis, using 100 times as much nonpyrogenic distilled water.

The yield was 0.8 million units of urokinase (specific activity: 45,000 units/mg.). When this urokinase was administered to rabbits at a rate of 3000 units/kg. of rabbit weight, the temperature rise in three rabbits was respectively 0.14° C., 0.20° C., and 0.11° C.; and in accordance with the Japanese Pharmacopoeia, 7th edition, they were judged pyrogenically negative. Incidentally, when a crude urokinase solution was administered the corresponding temperature rise in the rabbits was respectively, 1.26 1.49, and 0.90° C.

EXAMPLE 2

Amberlite 1RC-50 was suspended in a buffer solution of dibasic potassium phosphate and disodium phosphate at a concentration of 0.01 M and pH 8.0. The suspension was buffer-treated by stirring it for one hour with the pH maintained at 9.0 while gradually adding drop by drop a 28% aqueous solution of ammonia. Thereafter a column of 3 cm.$\phi$ x 40 cm. was formed. 0.8 million units of a crude urokinase solution at a specific activity of 800 units/mg., which had been obtained by elution with an alkaline solution after adsorption of urokinase in human urine on kaolin, was adsorbed on this column. Then it was washed with 15 l. of the above-mentioned nonpyrogenic phosphorus buffer solution at 0.01 M and pH 8.0. Finally, elution was carried out with a 4% aqueous solution of ammonia. By dialysis of the obtained eluent in the same way as in Example 1 a urokinase solution with a specific activity higher than 6000 units/mg. was obtained, with a yield of 50%. As the result of the same test for pyrogenic substances as in Example 1, carried out with this solution, the rabbits exhibited a temperature rise of respectively 0.21°, 0.19° and 0.22° and were judged pyrogenically negative. In the case of a crude urokinase solution the corresponding figures were 1.23, 1.26 and 1.18, showing that the rabbits turned pyrogenically positive.

What is claimed is:

1. A method of eliminating pyrogenic substances from urokinase which comprises the step of adsorbing said urokinase on a weakly acidic ion exchange material buffered by a nonpyrogenic electrolyte solution having a pH value of 8.0–9.5 and an electrolyte concentration of 0.01 M–0.3 M.

2. The method of claim 1 in which said ion exchange material containing urokinase is washed with a solution that will not elute said urokinase to remove said pyrogenic substances and then said urokinase is eluted from said ion exchange material with a nonpyrogenic electrolyte solution having a pH value of 7.5–13 and a concentration of 0.5 M–3 M.

References Cited
UNITED STATES PATENTS 3,542,646  11/1970  Aoki et al. _____ 195—66 B LIONEL M. SHAPIRO, Primary Examiner